(12) United States Patent  
Deivasigamani

(10) Patent No.: US 7,932,833 B2
(45) Date of Patent: Apr. 26, 2011

(54) DETECTING COOLANT FLOW REDUCTION FOR A MARINE ENGINE SYSTEM

(75) Inventor: Sridhar Deivasigamani, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 646 days.

(21) Appl. No.: 11/987,546

(22) Filed: Nov. 30, 2007

(65) Prior Publication Data

US 2009/0139317 A1 Jun. 4, 2009

(51) Int. Cl.
G08B 21/00 (2006.01)
G01M 15/00 (2006.01)
G01M 17/00 (2006.01)
F02B 41/00 (2006.01)
F01P 9/00 (2006.01)

(52) U.S. Cl. ..... 340/606; 340/603; 340/605; 73/114.31; 73/114.32; 73/114.34; 701/29; 701/30; 701/31; 701/32; 701/33; 123/22; 123/41.01

(58) Field of Classification Search .................. 340/605, 340/606, 603; 73/114.31, 114.32, 114.34; 701/29–33; 123/22, 41.01
See application file for complete search history.

(56) References Cited

U.S. PATENT DOCUMENTS

| | | | |
|---|---|---|---|
| 3,257,643 A | 6/1966 | Jensen | |
| 4,019,489 A | 4/1977 | Cartmill | |
| 4,143,255 A | 3/1979 | Herscovitz | |
| 4,160,733 A | 7/1979 | Nelson | |
| 4,598,278 A | 7/1986 | Ford | |
| 4,630,036 A | 12/1986 | Ford | |
| 4,695,822 A | 9/1987 | Furukawa | |
| 5,045,001 A | 9/1991 | Borst | |
| 5,133,303 A * | 7/1992 | Umehara | 123/41.15 |
| 5,467,643 A | 11/1995 | Barnett et al. | |
| 5,643,019 A | 7/1997 | Barnett et al. | |
| 6,240,774 B1 * | 6/2001 | Niki et al. | 73/114.68 |
| 6,684,826 B2 * | 2/2004 | Yoshikawa et al. | 123/41.1 |
| 6,701,232 B2 * | 3/2004 | Yamaki | 701/33 |
| 6,804,588 B2 * | 10/2004 | Oki et al. | 701/29 |
| 6,883,369 B1 | 4/2005 | Myhre | |
| 7,409,929 B2 * | 8/2008 | Miyahara et al. | 123/41.05 |
| 2006/0226084 A1 | 10/2006 | Gross | |

* cited by examiner

Primary Examiner — Benjamin C Lee
Assistant Examiner — Lam P Pham
(74) Attorney, Agent, or Firm — Finnegan, Henderson, Farabow, Garrett & Dunner LLP

(57) ABSTRACT

A system for detecting a reduction in engine coolant flow rate is provided. The system includes a device configured to monitor at least one parameter associated with an engine, and a device configured to measure actual engine air intake manifold temperature. The system further includes a controller configured to determine a theoretical engine air intake manifold temperature based on the at least one monitored parameter, compare the theoretical engine air intake manifold temperature with the actual measured engine air intake manifold temperature, and generate a signal indicative of engine coolant flow rate.

15 Claims, 2 Drawing Sheets

DETECTING COOLANT FLOW REDUCTION FOR A MARINE ENGINE SYSTEM

TECHNICAL FIELD

The present disclosure relates generally to a marine engine system and, more particularly, to detecting coolant flow reduction for a marine engine system.

BACKGROUND

A marine engine system may include an engine with a combustion chamber to burn air and fuel to produce power, a cooling system for cooling the engine and various other engine system components. The cooling system of a typical marine engine system may use untreated or raw water, for example, seawater, as coolant to cool engine system components. In normal operation, cooling water may be drawn by a water pump into the cooling system via a water inlet, such as a seacock or a valve. Since a body of water may contain various types of matter and foreign objects such as seaweed, marine life, dissolved mineral, shell, plastic object, and debris, it is possible that such matter and/or foreign objects may enter the cooling system and create a blockage. Flow could also be blocked if a rubber impeller in a typical sea water pump fails or becomes jammed by a foreign object. Such a blockage could cause flow reduction, or a complete shut-off of cooling water flow. This, in turn, can lead to overheating of the engine and other components relying on cooling water. Even a relatively moderate blockage could cause poor component performance and result in more frequent maintenance.

To prevent a blockage in water flow, various strainers have been used at the water inlet to prevent entry of foreign objects. However, even with the use of strainers, blockage still can occur over time. For example, some material and/or foreign objects may still make their way into the cooling system and cause a blockage or flow reduction, or the strainer itself could be blocked. In-line flow detectors have been used to detect flow reduction. However, such intrusive devices may themselves affect flow. It is desirable to have timely detection of a reduction in flow of cooling water so that appropriate actions can be taken to prevent damage to marine engine system components and improve operating efficiency.

One attempt to detect a reduction in cooling water flow is described in U.S. Pat. No. 4,630,036 (the '036 patent) issued to Ford on Dec. 16, 1986. The '036 patent discloses a warning system that detects a reduction of cooling water flow by monitoring a resistance ground signal generated by a sensing element inserted into the cooling system. The various embodiments disclosed in the '036 patent include a sensing element that is intrusive to existing cooling system components.

While the '036 patent may provide for detecting cooling water flow rate reduction, the system disclosed in the '036 patent includes sensors that must be installed in the engine exhaust system. The exhaust system passageway must be breached to allow mounting of the sensors. As a result, the system may be complicated to install, and the intrusive sensor may itself interfere with flow and may be damaged by material such as debris in the cooling water.

The system and method of the present disclosure are directed toward improvements in the existing technology.

SUMMARY

In one aspect, the present disclosure is directed to a system for detecting a reduction in engine coolant flow rate. The system includes a device configured to monitor at least one parameter associated with an engine. A device is configured to measure actual engine air intake manifold temperature. A controller is configured to determine a theoretical engine air intake manifold temperature based on the at least one monitored parameter, compare the theoretical engine air intake manifold temperature with the actual measured engine air intake manifold temperature, and generate a signal indicative of engine coolant flow rate.

In another aspect, the present disclosure is directed to a method of detecting a reduction in engine coolant flow rate. At least one parameter associated with an engine is monitored. The actual engine air intake manifold temperature is measured. A theoretical engine air intake manifold temperature is calculated based on the at least one monitored parameter. The theoretical engine air intake manifold temperature is compared with the actual measured engine air intake manifold temperature, and a signal indicative of a reduction in engine coolant flow rate is generated.

DETAILED DESCRIPTION

Figure 1:
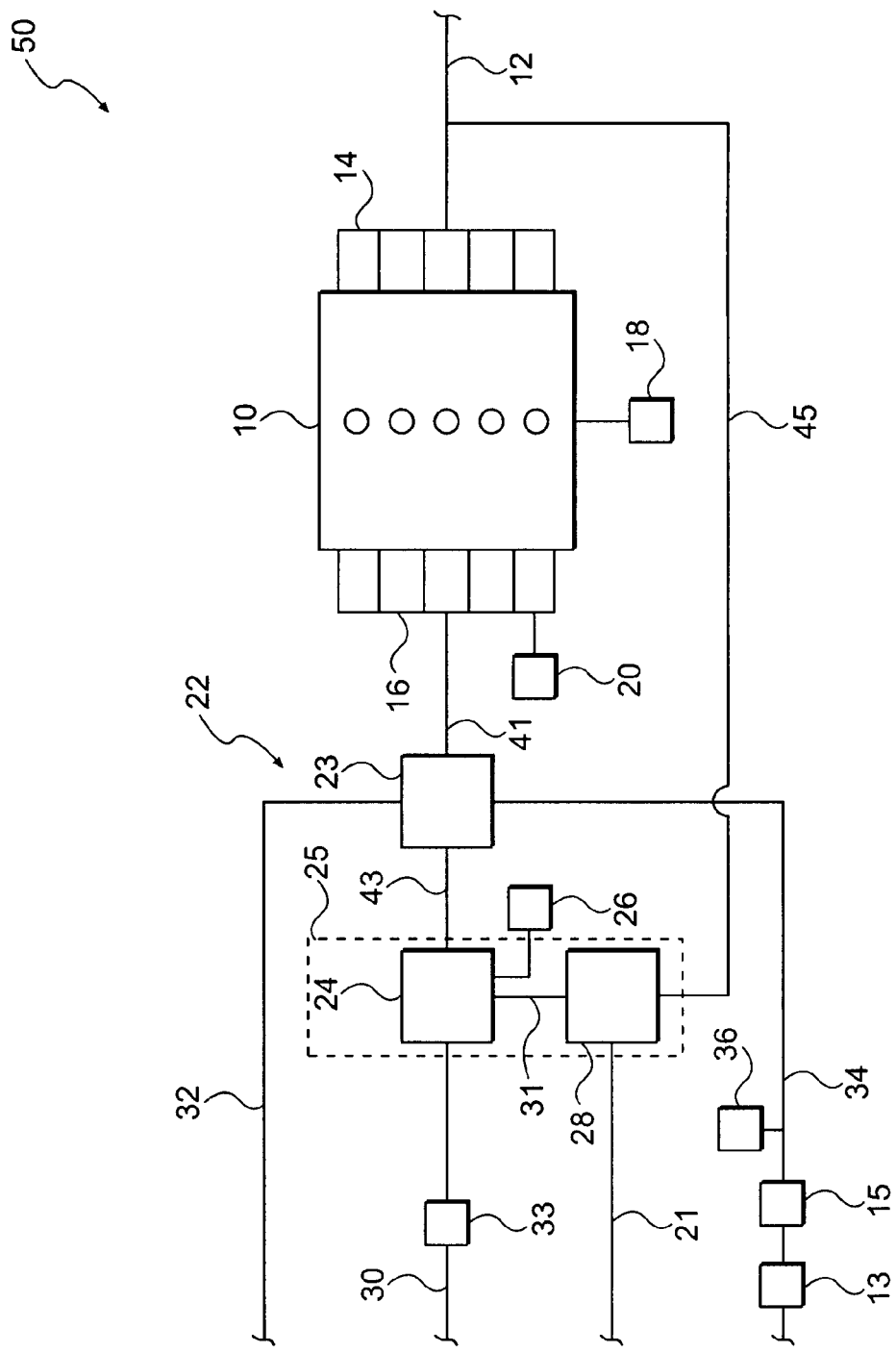
FIG. 1 is a schematic illustration of an exemplary marine engine system.

FIG. 1 schematically illustrates an exemplary marine engine system 50 where the disclosed system for detecting a reduction in engine coolant flow rate can be used. Engine system 50 may, for example, be associated with a stationary installation in or adjacent a body of water, or associated with a mobile vessel navigating a body of water. Engine system 50 may include an engine 10, which may be a gasoline engine, a diesel engine or the like which burns fuel and air in a combustion chamber to produce power. Engine 10 may be provided with an air intake system which may include an air intake manifold 16 where air is taken into the engine for combustion, and an exhaust system which may include an exhaust manifold 14 and an exhaust pipe 12.

Engine system 50 may also be provided with one or more turbochargers 25 to boost the power output of engine 10. Turbocharger 25 may include a turbine 28 with a turbine wheel and a compressor 24 mechanically linked with the turbine 28 via a shared rotating axle 31. Turbine 28 may be connected through a conduit 45 with the engine exhaust manifold 14. Turbocharger 25 may recycle exhaust energy to drive turbine 28, which may cause compressor 24 to rotate via the shared rotating axle 31. Turbine 28 may also be connected to an exhaust line 21. Air may be drawn into the compressor 24 via an air inlet 30 and a suitable filter 33, and then compressed before being delivered to engine 10.

As illustrated in FIG. 1, engine system 50 may include a cooling system 22 to reduce temperature of engine 10 and various components. Cooling system 22 may include a charge air cooler 23. A coolant inlet 34 and a coolant outlet 32 forming a coolant flow path may be associated with the charge air cooler 23 as shown in FIG. 1. Coolant may flow into the cooling system 22 via coolant inlet 34, pass through various system components, such as the charge air cooler 23, and flow out of the cooling system via the coolant outlet 32. Although not shown in FIG. 2, one skilled in the art may recognize that cooling system 22 may further include additional components, such as one or more heat exchangers, a gear oil cooler, a fuel cooler, etc. The coolant for cooling system 22 may be water, such as seawater, drawn from a water body by a water pump 15, for example, located downstream of a strainer 13 adjacent the coolant inlet 34. Charge air cooler 23 may be connected with compressor 24 via a conduit 43, and with the air intake manifold 16 via a conduit 41, such that hot air from compressor 24 may be cooled by charge air cooler 23 before being delivered to air intake manifold 16 and engine 10.

As also shown in FIG. 1, engine system 50 may include various sensors 18, 19, 20, 26 and 36 disposed at suitable locations for monitoring parameters associated with engine system 50. One or more of sensors 18, 19, 20, 26 and 36 may be part of the disclosed coolant flow rate reduction detection system, which will be discussed in detail in the following paragraphs.

Figure 2:
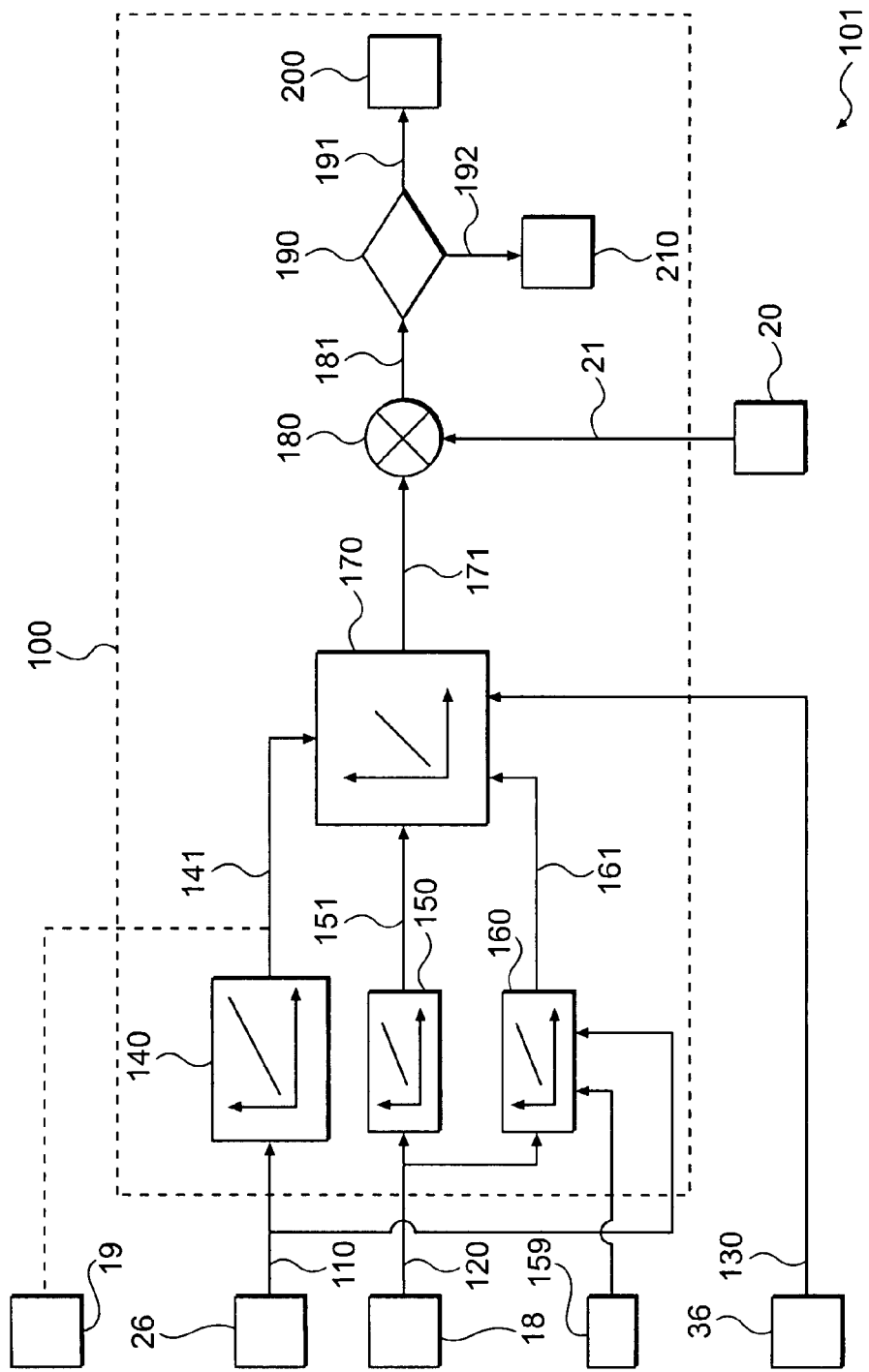
FIG. 2 is a diagrammatic and schematic representation of an exemplary embodiment of the disclosed system for detecting a reduction in coolant flow rate.

FIG. 2 diagrammatically illustrates an exemplary detection system 101 for detecting a reduction in engine coolant flow rate in accordance with one embodiment of the disclosure. Detection system 101 may include a device configured to monitor at least one parameter associated with engine 10. The at least one parameter associated with engine 10 could be engine speed 120, turbo boost pressure 110, intake air mass flow 141 in the engine air intake system, and/or coolant temperature 130 adjacent the coolant inlet 34. Accordingly, the device for monitoring parameters associated with engine 10 may include a sensor 18 associated with engine 10 for measuring engine speed, a sensor 26 associated with turbocharger compressor 24 for measuring turbo boost pressure 110 in the engine air intake system, and may further include a temperature sensor 36 disposed adjacent coolant inlet 34, for example, at or near the inlet to charge air cooler 23, for measuring coolant temperature 130 adjacent coolant inlet 34. The temperature sensor 36 may be an electrically non-intrusive sensor. In other words, sensor 36 may be a sensor that does not generate current in the environment where it is disposed and cause corrosion to the charge air cooler 23 or any other cooling system components.

In accordance with one embodiment of the disclosed system 101, engine coolant could be seawater, and the temperature of engine coolant adjacent coolant inlet 34 could be seawater temperature. In some embodiments, the sensor 26 for measuring turbo boost pressure 110 may be mounted adjacent the outlet of compressor 24, or on the intake manifold 16, or on conduit 43 connecting the compressor 24 and the charge air cooler 23. As shown in FIG. 2, detection system 101 may further include a temperature sensor 20 disposed adjacent air intake manifold 16 for measuring actual engine air intake manifold temperature 21. Intake air mass flow 141 may be, as illustrated in FIG. 2, calculated with the aid of a computer map 140 based on the turbo boost pressure 110 measured by the sensor 26, or alternatively, measured by a sensor 19 which may be any type of suitable sensor for measuring air mass flow. Sensor 19 may be located adjacent the air intake manifold 16, for example.

Detection system 101 may include a controller 100 configured to determine a theoretical engine air intake manifold temperature 171 based on the at least one monitored parameter, compare the theoretical engine air intake manifold temperature 171 with the actual engine air intake manifold temperature 21 measured by sensor 20, for example, and generate a signal 181 indicative of engine coolant flow rate. Although not shown in FIG. 2, one skilled in the art may recognize that controller 100 may further include one or more devices, such as an analog-to-digital converter, for processing sensor signals.

Controller 100 may include various programs, algorithms, computer maps, etc., relating values of some parameters to values of other parameters. For example, computer map 140 may relate turbo boost pressure with intake air mass flow, and may be used to process an actual measured turbo boost pressure 110 to determine a theoretical intake air mass flow 141. Similarly, computer map 150 may be used to process the actual measured engine speed 120 to determine a theoretical quantity of coolant flow 151. Computer map 160 may be used to process the actual measured turbo boost pressure 110, engine speed 120, and ambient air temperature 159 to determine a theoretical temperature of boosted intake air 161. Ambient air temperature 159 may be measured by any suitable air temperature sensor known in the art. Controller 100 may further include another computer map 170, that may relate at least one parameter to engine air intake manifold temperature. Computer map 170 may be used to process one or more parameters, such as the intake air mass flow 141, the quantity of coolant flow 151, the temperature of boosted intake air 161, the temperature 130 of engine coolant adjacent the coolant inlet 34, etc., to determine a theoretical engine air intake manifold temperature 171.

A comparator 180 may be provided for comparing the theoretical engine air intake manifold temperature 171 with the actual engine air intake manifold temperature 21 derived from sensor 20, and for generating a signal 181 indicative of engine coolant flow rate. The signal 181 generated by comparator 180 may represent temperature difference between the theoretical engine air intake manifold temperature 171 and the actual engine air intake manifold temperature 21. A decision box 190 may be provided with a predetermined difference value as a reference for comparing the temperature difference. The predetermined difference value could be a percentage, for example, 10%, of the actual engine air intake manifold temperature 21, or an absolute temperature value, for example, 10 degrees. If the actual temperature difference exceeds the predetermined difference value, then the decision box 190 may send out a signal 192 indicative of "blockage/flow rate reduction" to a warning indicator 210, which can generate an audible and/or visual warning. If the temperature difference does not exceed the predetermined difference value, the decision box 190 may send out a signal 191 indicative of "no blockage/no flow rate reduction" to a box 200 when no action is to be initiated. In one embodiment, decision box 190 may include a logic circuit to process a decision.

INDUSTRIAL APPLICABILITY

The disclosed detection system 101 for detecting a reduction in engine coolant flow rate may be applicable to any marine engine system. For example, the disclosed detection system 101 may provide an early warning of a reduction in engine coolant flow rate indicative of a possible blockage by material contained in cooling water, such as foreign objects, so that actions may be taken to prevent damage to engine system components. Detection system 101 achieves detection by, for example, monitoring at least one parameter associated with engine 10, calculating a theoretical engine air intake manifold temperature 171 based on the at least one monitored parameter, comparing the theoretical engine air intake manifold temperature 171 with an actual, measured engine air intake manifold temperature 21, and generating a signal indicative of a reduction in engine coolant flow rate.

Referring to FIG. 1, engine system 50 may be installed on a marine vessel, such as a boat, to produce power for moving the marine vessel. Engine system 50 may include a turbocharged engine 10, which may receive intake air from a compressor 24 of a turbocharger 25 via a charge air cooler 23. Cooling system 22 may include a coolant flow path with a coolant inlet 34 and a coolant outlet 32, and may include the charge air cooler 23 for reducing the temperature of intake air. Coolant may be seawater drawn from the sea, for example, and may enter the coolant inlet 34, flow through various cooling system components, and be expelled out of the cooling system from the coolant outlet 32.

In both FIG. 1 and FIG. 2, sensors 18, 19, 20, 26, and 36 may form part of the coolant flow rate reduction detection system 101. Sensor 18 may determine engine speed 120 in any suitable manner. Sensor 19 may be any suitable sensor for measuring intake air mass flow 141, and may be located adjacent the air intake manifold 16, for example. Temperature sensor 20 may be suitably associated with air intake manifold 16 to measure the actual engine air intake manifold temperature 21. Sensor 26 may be used to measure turbo boost pressure 110 generated by compressor 24. Sensor 36 may be suitably located adjacent coolant inlet 34 associated with the charge air cooler 23 to measure coolant temperature 130. In some embodiments, the coolant may be seawater, and the sensor 36 may sense seawater temperature.

Controller 100 may be used to determine whether there is a reduction in engine coolant flow rate, and may generate a warning signal, so that an operator may be alerted when a reduction in coolant flow rate occurs. Controller 100 may receive and process signals from sensors 18, 19, 20, 26, and 36. In some embodiments, controller 100 may be integrated with an onboard computer of a marine vessel. In other embodiments, controller 100 may be an independent control unit. Software and hardware, such as a computer monitor, may be associated with the controller to provide a suitable user interface for monitoring coolant flow.

Computer map 140 may be used to calculate a theoretical intake air mass flow 141 based on the actual measured turbo boost pressure 110 from sensor 26. Computer map 150 may be used to calculate a theoretical quantity of coolant flow 151 upon receiving the actual engine speed signal 120 from sensor 18. Computer map 160 may be used to calculate a theoretical temperature of boosted intake air 161, for example, based on the two parameters of turbo boost pressure 110 and engine speed 120. Computer map 170 may enable combining, for example, the intake air mass flow 141, the quantity of coolant flow 151, and the temperature of boosted intake air 161, with the actual measured coolant temperature 130 to produce a theoretical value of the engine air intake manifold temperature 171. The various computer maps may be adapted to calculate values for other desired parameters, including various parameters other than those described above.

Comparator 180 generally may be used to compare any two given quantities and produce a quantity indicative of the difference between those two quantities. In one embodiment of this disclosure, comparator 180 may be used to compare the theoretical value of engine air intake manifold temperature 171 with the actual measured value of engine air intake manifold temperature 21, and produce a signal indicative of the actual temperature difference between these two values. The actual temperature difference may be compared with a predetermined difference value in a decision box 190 to determine whether a reduction in engine coolant flow rate has occurred. The predetermined difference value may be derived from test data or other empirical data. The operator may set the predetermined value to be an absolute value in temperature, or a percentage of the actual measured engine air intake manifold temperature 21. The operator may vary the difference value to vary the sensitivity of the detection system 101.

If the temperature difference is larger than the predetermined difference value in decision box 190, then the decision box 190 may send a signal to a warning indicator 210 to produce an audible and/or visual warning. The decision box 190 may send a signal indicative of "no blockage/no flow reduction" to the box 200 when no action is to be initiated.

As will be apparent from the foregoing description, a system for detecting a reduction in engine coolant flow rate is provided with various sensors for measuring various parameters associated with engine 10, and a controller 100 for determining the occurrence of a coolant flow rate reduction based on the monitored parameters. The disclosed system is capable of detecting flow rate reduction without using invasive devices for measuring coolant flow. Existing marine engine systems may incorporate a detection system in accordance with disclosed embodiments with only the addition of control electronics and programming, and a sensor for coolant intake temperature. The predetermined temperature difference value in the decision box may be easily adjusted, allowing further flexibility of changing system sensitivity to accommodate environment changes. This may further improve detection accuracy under changing environment, which in turn can provide better prevention of damage to engine components.

It will be apparent to those skilled in the art that various modifications and variations can be made in the disclosed system for detecting engine coolant flow rate reduction. Other embodiments will be apparent to those skilled in the art from consideration of the specification and practice of the disclosed embodiments herein. It is intended that the specification and examples be considered as exemplary only, with a true scope of the disclosure being indicated by the following claims.

What is claimed is:

1. A system for detecting a reduction in engine coolant flow rate, comprising:
 a device configured to monitor at least one parameter associated with an engine, wherein the at least one parameter includes at least one of engine speed, turbo boost pressure, intake air mass flow in an engine air intake system, and a temperature of an engine coolant adjacent a coolant system inlet of a charge air cooler through which the engine coolant flows;
 a device configured to measure actual engine air intake manifold temperature; and
 a controller configured to:
 determine a theoretical engine air intake manifold temperature based on the at least one monitored parameter; and
 generate a signal indicative of a reduction in engine coolant flow rate based on a comparison of the theoretical engine air intake manifold temperature with the actual measured engine air intake manifold temperature.

2. The system of claim 1, wherein the engine coolant is seawater.

3. The system of claim 1, wherein the device configured to monitor at least one parameter associated with the engine includes a sensor configured to measure the at least one of engine speed, turbo boost pressure, intake air mass flow in the engine air intake system, and the temperature of the engine coolant adjacent the cooling system inlet.

4. The system of claim 1, wherein the device configured to measure actual engine air intake manifold temperature includes a temperature sensor disposed adjacent the engine air intake manifold.

5. The system of claim 1, wherein the controller includes at least one computer map relating the at least one parameter to engine air intake manifold temperature.

6. The system of claim 1, wherein the controller includes a comparator for comparing the theoretical engine air intake manifold temperature with the actual engine air intake manifold temperature and generating the signal indicative of engine coolant flow rate, and wherein the system further includes a warning indicator configured to generate an audible and/or visual warning responsive to a predetermined difference between the theoretical engine air intake manifold temperature and the actual engine air intake manifold temperature.

7. A method of detecting a reduction in engine coolant flow rate, comprising:
   monitoring at least one parameter associated with an engine, wherein the at least one parameter includes at least one of engine speed, turbo boost pressure, intake air mass flow in an engine air intake system, and a temperature of an engine coolant adjacent a coolant system inlet of a charge air cooler through which the engine coolant flows;
   measuring actual engine air intake manifold temperature;
   calculating a theoretical engine air intake manifold temperature based on the at least one monitored parameter; and
   generating a signal indicative of a reduction in engine coolant flow rate based on a comparison of the theoretical engine air intake manifold temperature with the actual measured engine air intake manifold temperature.

8. The method of claim 7, wherein the engine coolant is seawater.

9. The method of claim 7 wherein calculating a theoretical engine air intake manifold temperature based on the at least one parameter includes comparing each of turbo boost pressure in an air intake system and engine speed to one or more computer maps to determine intake air mass flow, quantity of coolant flow, and temperature of boosted intake air.

10. The method of claim 9 further including comparing engine coolant temperature adjacent a cooling system inlet, intake air mass flow, quantity of coolant flow, and temperature of boosted intake air to a further computer map to determine the theoretical engine air intake manifold temperature.

11. The method of claim 7, further including generating an audible and/or visual warning when reduction in engine coolant flow rate exceeds a predetermined amount.

12. A marine engine system, comprising:
   an engine including an air intake system and an exhaust system;
   an intake manifold associated with the air intake system;
   a cooling system including a flow path for coolant;
   a device configured to monitor at least one parameter associated with the engine, wherein the at least one parameter includes at least one of engine speed, turbo boost pressure, intake air mass flow in an engine air intake system, and a temperature of an engine coolant adjacent a coolant system inlet of a charge air cooler through which the engine coolant flows;
   a device configured to measure actual engine air intake manifold temperature; and
   a controller configured to:
   determine a theoretical engine air intake manifold temperature based on the at least one monitored parameter; and
   generate a signal indicative of a reduction in engine coolant flow rate based on a comparison of the theoretical engine air intake manifold temperature with the actual measured engine air intake manifold temperature.

13. The marine engine system of claim 12, further including: a turbocharger, the turbocharger including a compressor associated with the air intake system and configured to boost the pressure of air within the intake system.

14. The marine engine system of claim 13, wherein the charge air cooler is configured to reduce a temperature of the boosted air.

15. The marine engine system of claim 14, wherein the controller includes at least one map relating engine speed, turbo boost pressure, intake air mass flow, and temperature of engine coolant adjacent the coolant inlet to engine air intake manifold temperature, further including a warning indicator configured to generate an audible and/or visual warning responsive to a predetermined difference between the theoretical engine air intake manifold temperature and the actual engine air intake manifold temperature.

* * * * *